(12) United States Patent
Liñero

(10) Patent No.: US 7,578,551 B2
(45) Date of Patent: Aug. 25, 2009

(54) AIRCRAFT SEAT ASSEMBLY

(75) Inventor: Luis Gonzalez Liñero, Bristol (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 11/642,106

(22) Filed: Dec. 20, 2006

(65) Prior Publication Data

US 2007/0145789 A1 Jun. 28, 2007

(30) Foreign Application Priority Data

Dec. 22, 2005 (GB) ................. 0526205.0

(51) Int. Cl.
| | |
|---|---|
| A47C 4/00 | (2006.01) |
| A47C 4/28 | (2006.01) |
| A47C 1/124 | (2006.01) |
| A47C 15/00 | (2006.01) |
| A47C 7/02 | (2006.01) |

(52) U.S. Cl. .................. 297/107; 297/112; 297/42; 297/43; 297/44; 297/45; 297/234; 297/236; 297/248; 297/350; 297/351; 297/452.2

(58) Field of Classification Search ................ 297/232, 297/234, 235, 236, 237, 238, 248, 350, 351, 297/42, 43, 44, 45, 112, 107
See application file for complete search history.

(56) References Cited

U.S. PATENT DOCUMENTS

| 18,377 | A | * | 10/1857 | Beach | 297/234 |
|---|---|---|---|---|---|
| 122,730 | A | * | 1/1872 | Mealia | 297/234 |
| 335,037 | A | * | 1/1886 | Noel | 297/43 |
| 362,720 | A | * | 5/1887 | Collins | 297/43 |
| 371,091 | A | * | 10/1887 | Miller | 297/112 |
| 400,357 | A | * | 3/1889 | O'Hare | 297/44 X |
| 412,400 | A | * | 10/1889 | Milliken | 297/44 |
| 464,511 | A | * | 12/1891 | Milliken | 297/44 X |
| 883,929 | A | * | 4/1908 | Baxter | 297/234 |
| 966,891 | A | * | 8/1910 | Dudley | 297/112 |
| 1,071,246 | A | * | 8/1913 | Lee | 297/44 X |
| 1,133,500 | A | * | 3/1915 | Pollard | 297/112 |
| 1,136,308 | A | * | 4/1915 | Brewer | 297/44 X |
| 1,143,566 | A | * | 6/1915 | Andrews | 297/44 |

(Continued)

FOREIGN PATENT DOCUMENTS

DE 43 37 938 C1 5/1995

(Continued)

*Primary Examiner*—Rodney B White
(74) *Attorney, Agent, or Firm*—Patterson, Thuente, Skaar & Christensen, P.A.

(57) ABSTRACT

An aircraft seat assembly comprises a continuous row of a plurality of seats including a convertible aisle seat at one end of the row and one or more other seats. The seats are moveable between (i) a first configuration in which all of the seats are positioned in a useable position and a second configuration in which (a) the convertible seat is positioned in an unusable position in the row, (b) said one or more other seats are positioned in a useable position, and (c) the row of seats has a length, along the row, that is less than the length of the row in the first configuration for example by a distance of more than half the width of the convertible seat in the first configuration. The width of said one or more other seats may remain unchanged as between the first and second configurations.

7 Claims, 8 Drawing Sheets

U.S. PATENT DOCUMENTS

| | | | | |
|---|---|---|---|---|
| 1,250,691 | A * | 12/1917 | Stalter | 297/43 X |
| 1,267,290 | A * | 5/1918 | Tubbs | 297/43 |
| 1,279,414 | A * | 9/1918 | Okun | 297/234 |
| 1,369,543 | A * | 2/1921 | Reider | 297/234 |
| 1,420,095 | A * | 6/1922 | Gutter | 297/44 |
| 1,963,835 | A * | 6/1934 | Deland | 297/44 |
| 2,116,366 | A * | 5/1938 | Scott | 297/43 |
| 2,292,586 | A * | 8/1942 | Thompson | 297/44 |
| 2,433,090 | A * | 12/1947 | Cass | 297/44 |
| 2,522,729 | A * | 9/1950 | Putnam | 297/44 |
| 2,621,708 | A * | 12/1952 | Luce, Jr. | 297/117 |
| 2,696,246 | A * | 12/1954 | Louis | 297/236 X |
| 2,699,202 | A * | 1/1955 | Leary et al. | 297/248 X |
| 2,782,870 | A * | 2/1957 | Sill | 297/44 X |
| 3,142,351 | A * | 7/1964 | Green | 297/44 X |
| 3,743,351 | A * | 7/1973 | Harris | 297/112 X |
| 3,759,572 | A * | 9/1973 | Koepke | 297/351 X |
| 4,493,285 | A * | 1/1985 | Williams | 297/350 X |
| 4,498,649 | A | 2/1985 | Toll | |
| 4,889,383 | A * | 12/1989 | Jones | 297/45 X |
| 5,240,276 | A * | 8/1993 | Coombs | 297/42 X |
| 5,558,309 | A | 9/1996 | Marechal | |
| 5,564,786 | A * | 10/1996 | Peek et al. | 297/452.2 X |
| 5,597,139 | A | 1/1997 | Beroth | |
| 5,607,202 | A * | 3/1997 | Toso et al. | 297/44 |
| 5,660,436 | A * | 8/1997 | Wilson | 297/236 X |
| 5,769,360 | A * | 6/1998 | Kerbis et al. | 297/248 X |
| 5,797,649 | A * | 8/1998 | Snell et al. | 297/42 X |
| 5,829,836 | A | 11/1998 | Schumacher et al. | |
| 5,954,402 | A * | 9/1999 | McInturff | 297/452.2 X |
| 5,984,418 | A * | 11/1999 | McInturff | 297/452.2 X |
| 6,352,307 | B1 * | 3/2002 | Engman | 297/284.11 |
| 6,773,059 | B2 * | 8/2004 | Volotsenko | 297/234 X |
| 6,913,318 | B2 * | 7/2005 | Higley et al. | 297/383 |
| 7,364,228 | B2 * | 4/2008 | Entz | 297/44 |
| 7,377,583 | B1 * | 5/2008 | Anthony et al. | 297/44 |
| 2003/0209929 | A1 | 11/2003 | Muin et al. | |
| 2004/0195450 | A1 | 10/2004 | Hiesener | |

FOREIGN PATENT DOCUMENTS

| | | |
|---|---|---|
| EP | 0 170 116 A1 | 2/1986 |
| EP | 0 322 930 A2 | 7/1989 |
| EP | 0 443 664 A1 | 8/1991 |
| EP | 0 530 900 A1 | 3/1993 |
| EP | 0 530 920 A1 | 3/1993 |
| EP | 0 530 923 A1 | 3/1993 |
| EP | 1 452 444 A1 | 9/2004 |
| GB | 403 387 | 12/1933 |
| WO | WO 90/02685 | 3/1990 |

* cited by examiner

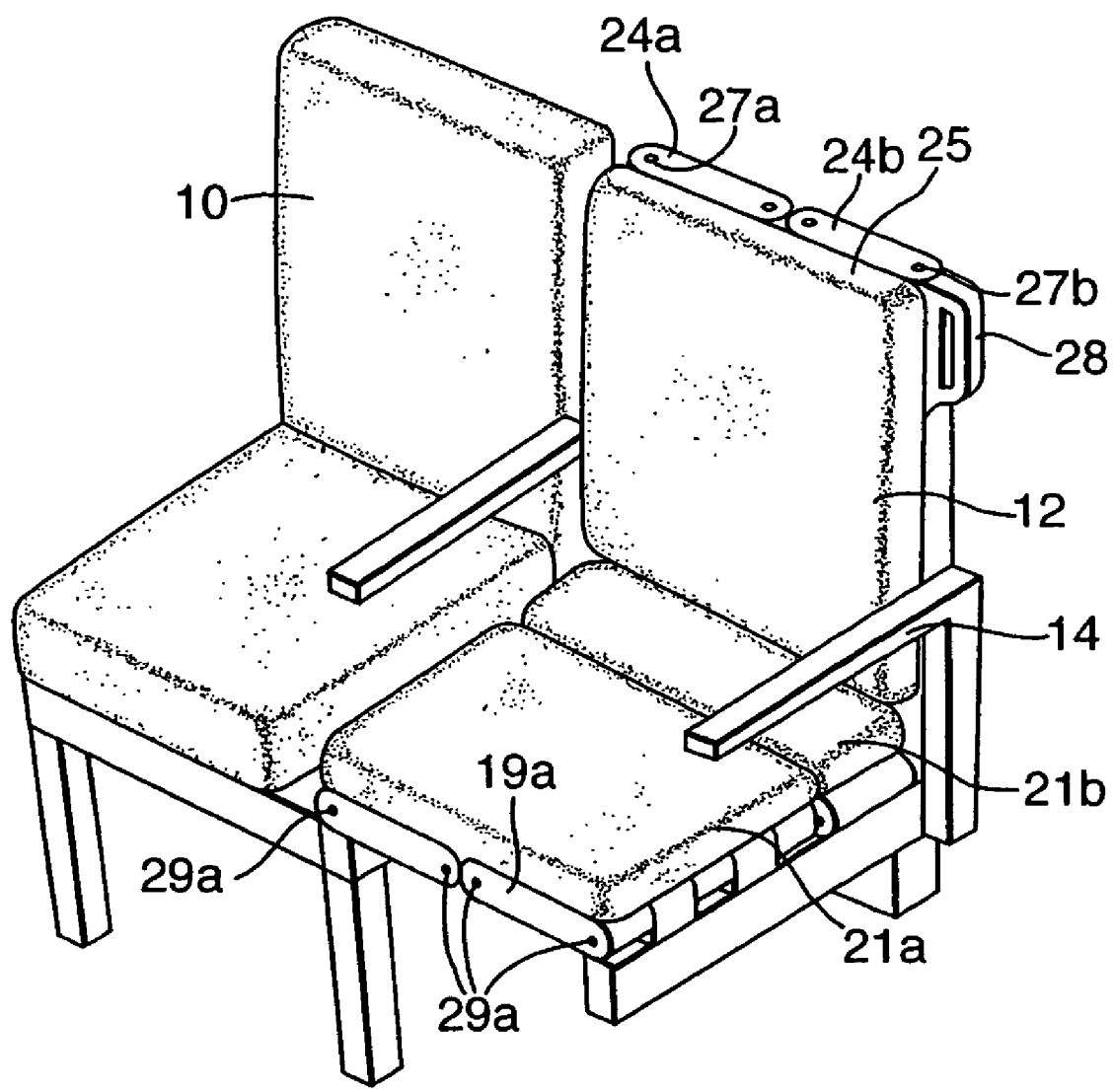

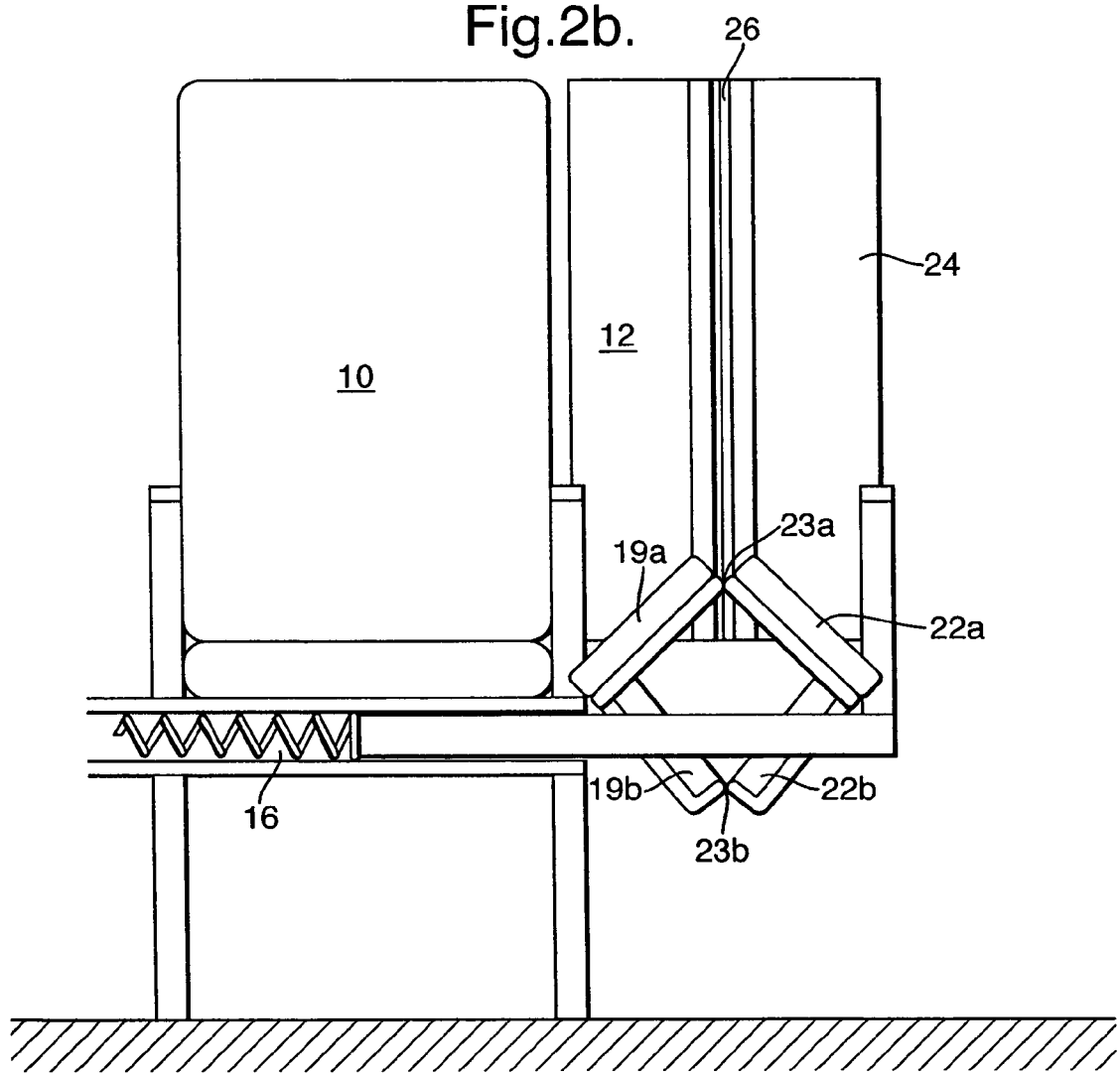

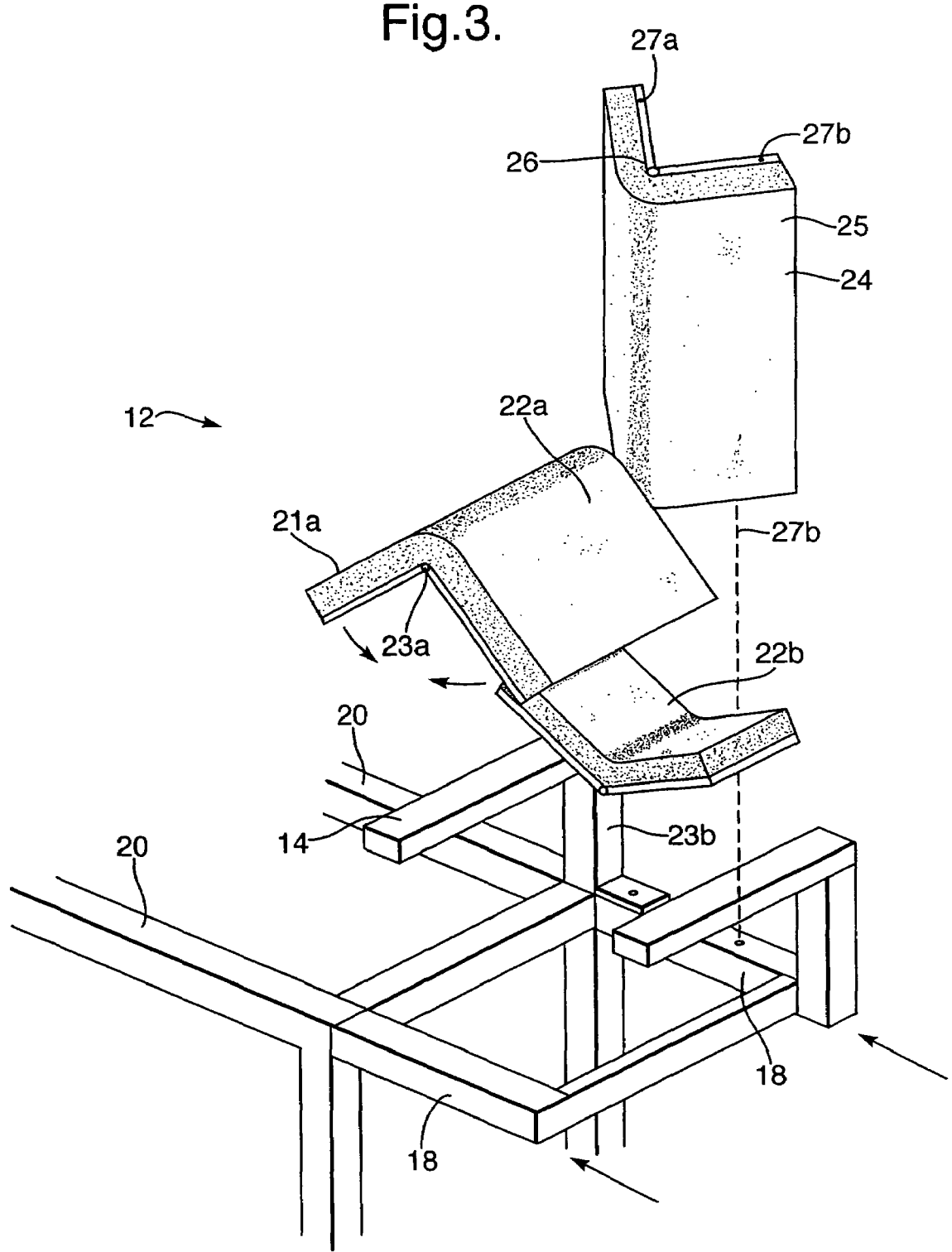

AIRCRAFT SEAT ASSEMBLY

RELATED APPLICATIONS

The present application is based on, and claims priority from, U.K. Patent Application Number 0526205.0, filed Dec. 22, 2005, the disclosure of which is hereby incorporated by reference herein in its entirety.

TECHNICAL FIELD

The present invention relates to an aircraft seat assembly.

BACKGROUND OF THE INVENTION

There are many different considerations that may be taken into account when designing an aircraft seat layout for an aircraft. Two conflicting considerations are firstly, for the sake of efficiency, the seats should be arranged to maximise as far as practicable the passenger density, and secondly, for the sake of passenger comfort and ease of embarking and disembarking, the aisles should be as wide as practicably possible. Of course, aiding embarking and disembarking results in improved turn-around times, which in turn may increase an airline's profitability and/or competitiveness.

There are many examples in the prior art of aircraft seat layout design including EP 0 322 930, EP 0 443 664, EP 0 530 900, EP 0 530 920, EP 0 530 923, U.S. Pat. Nos. 4,498,649, 5,829,836 and 6,776,457. Some of the prior art aircraft seat layout designs (for example EP 0 322 930) provide the ability to adjust the width of the aisle, but only as a result of changing the width of all of the seats in the row. Others merely provide the ability to change between 3-seat and 2-seat configuration in which the row has the same width. U.S. Pat. No. 5,829,836 discloses the possibility of increasing the width of the aisle by means of providing seats each having a width that narrows when not in use and widens when sat on by a passenger. The widening of the aisle is however limited. Moreover, if only one seat incorporates the system of U.S. Pat. No. 5,829,836, the width variation is limited; while if several seat use the system, the weight of the seat row is significantly increased.

The present invention seeks to provide an aircraft seat assembly that is moveable between two configurations such that the aisle width may be widened significantly. Additionally or alternatively, the present invention seeks to provide an aircraft seat assembly, which is configurable to allow efficient use of the space in the fuselage of the aircraft, not only enabling the aisle space to be readily increased when required, but also not reducing the number of passengers able to be carried by the aircraft.

SUMMARY OF THE INVENTION

The present invention provides an aircraft seat assembly comprising a continuous row of a plurality of seats including a convertible seat at one end of the row and one or more other seats, the seats being moveable between (i) a first configuration in which all of the seats are positioned in a useable position and (ii) a second configuration in which (a) the convertible seat is positioned in an unusable position in the row, (b) said one or more other seats are positioned in a useable position, and (c) the row of seats has a length, along the row, that is less than the length of the row in the first configuration, the width of said one or more other seats remaining unchanged as between the first and second configurations.

The present invention thus facilitates, in accordance with an embodiment of the invention, the design of an aircraft seat assembly comprising adjacent rows of seats and an aisle defined between the rows, the aisle having a width that may be significantly increased when the convertible seat is not in use simply by positioning the convertible seat of the row in the unusable position.

Preferably, the aircraft seat assembly is so arranged that in the second configuration the row of seats has a length, along the row, that is less than the length of the row in the first configuration by a distance more than half the width of the convertible seat in the first configuration. The length may be less by a distance greater than 75% of the width of the convertible seat when in the first configuration. The length may be less by a distance substantially equal to the width of the convertible seat when in the first configuration. Thus, in the second configuration the convertible seat may be so positioned that the row of seats has a length, along the row, that is lower than the length of the row in the first configuration by an amount substantially equal to the width of the convertible seat when in the first configuration.

The aircraft seat assembly may be so configured that the position as well as the width of said one or more other seats remains unchanged as between the first and second configurations. The seats other than the convertible seat do not therefore need to be moved in order to allow the length of the row to be changed.

The aircraft seat assembly may be so configured that in the second configuration the convertible seat is unusable in the sense that the portion of the seat that is sat on when in use by a passenger (in the first configuration) is moved to a position in which the portion is arranged not to be available for sitting on. For example, the portion of the seat that is, in the first configuration, sat on and in a substantially horizontal position may, in the second configuration, be arranged in a substantially vertical position. Alternatively, or additionally, the surface area of the portion of the seat that is, in the first configuration, available for sitting on and in a substantially horizontal position may, in the second configuration, be reduced by more than 50%, preferably more than 75%. Even more preferably, the surface area of the portion of the seat that is, in the first configuration, available for sitting on and in a substantially horizontal position may, in the second configuration, be substantially reduced to a negligible amount (substantially zero).

The convertible seat may comprise a seat base and a seat back that are both defined by flexible material that in the first configuration is stretched across the seat and in the second configuration is loosened. The flexible material may for example be arranged between supports that move together (relatively) when the convertible seat is moved from the first configuration to the second configuration.

The convertible seat may be collapsible, such that in the second configuration the convertible seat is in a collapsed position. The convertible seat may be in the form of a foldable seat. The foldable seat may be foldable such that in the second configuration the foldable seat is in a collapsed position.

The seat may be arranged to be collapsed in a vertical direction, for example such that the seat collapses into a sunken recess in the floor of the cabin of the aircraft. The seat is preferably arranged to be collapsed in a horizontal direction.

The convertible seat may be foldable such that in the second configuration the convertible seat is in a folded position. The seat may be arranged to be folded in a vertical direction. The seat is preferably arranged to be folded in a horizontal direction. For example, the convertible seat may comprise a foldable seat back that is foldable, in a horizontal direction, about a substantially upright axis. The convertible seat may alternatively, or additionally, comprise a foldable seat base that is foldable, in a horizontal direction, about a substantially horizontal axis. The axis about which there may be folding may be defined by one or more hinges.

The convertible seat may include a foldable seat base comprising a front foldable portion and a rear foldable portion. The front portion may be foldable about a substantially horizontal axis. The front portion may be foldable such that in the second configuration the folded front portion extends above the vertical position of the front portion in the first configuration. Thus the front portion when positioned midway between the first and second configurations can be sat on by a passenger to urge the seat all of the way to the first configuration. The rear portion may be foldable about a substantially horizontal axis. The rear portion may be foldable such that in the second configuration the folded rear portion extends below the vertical position of the rear portion in the first configuration. Having a rear portion that extends downwardly in the second configuration may provide space for other parts of the convertible seat to move, for example a seat back.

The convertible seat may comprise a seat back and a seat base that are foldable relative to each other about a substantially horizontal axis so that in the second configuration the seat base and seat back are folded together.

The aircraft seat assembly may be so configured that in the second configuration the convertible seat is stowed behind the row, for example immediately behind the seat in the row that in the first configuration is adjacent to the convertible seat.

The aircraft seat assembly may be so configured that in the second configuration the convertible seat is stowed underneath the seat in the row that in the first configuration is adjacent to the convertible seat.

The aircraft seat assembly may be so configured that the seat adjacent to the convertible seat includes a cavity, which accommodates at least part of the convertible seat in the second configuration.

The aircraft seat assembly may be so configured that the convertible seat comprises an inner side adjacent to the seat in the row that in the first configuration is adjacent to the convertible seat and an outer side at said one end of the row (i.e. at the end of the row at which the convertible seat is positioned in the first configuration), the sides of the seat being moveable towards and away from each other. The sides may be moveable relative to each other by means of a telescopic mechanism. The sides may be moveable relative to each other by means of a sliding mechanism.

The convertible seat and the one or more other seats may each comprise a seat base. The seat bases of the seats in the row may be so arranged that the width of the seat base of the convertible seat in the first configuration may be substantially the same as the width of the seat base of at least one, and preferably all, of said one or more other seats. Thus in an embodiment of the invention, the aisle space may be widened when the convertible seat is not in use, for example during embarkation or disembarkation, whilst not reducing the seat width in the first configuration, thereby not detracting from the comfort of a passenger while seated in the convertible seat as compared to one of the other seats.

In certain embodiments of the invention (not illustrated herein), the width of said one or more other seats could also be changed, such that in a third configuration, the widths of one or more of said other seats is reduced or increased. Thus, there is provided an aircraft seat assembly comprising a continuous row of a plurality of seats including a convertible seat at one end of the row and one or more other seats, the seats being moveable between (i) a first configuration in which all of the seats are positioned in a useable position and (ii) a second configuration in which the convertible seat is positioned in an unusable position in the row, and the row of seats has a length, along the row, that is less than the length of the row in the first configuration. In a third configuration said one or more other seats may be positioned in an unuseable position. Other features of the present invention as described herein may be incorporated into this aspect of the invention.

The present invention also provides an aircraft fuselage in which there is installed an aircraft seat assembly according to the present invention as described herein.

The present invention further provides an aircraft fuselage in which there is installed an aircraft seat assembly comprising two adjacent continuous rows of a plurality of seats, there being defined an aisle-space between the two rows, each row of seats including a convertible seat at the end of the row next to the aisle-space and one or more other seats, the seats being moveable between (i) a first configuration in which all of the seats are positioned in a useable position and (ii) a second configuration in which (a) the convertible seat is positioned in an unusable position in the row, and said one or more other seats are positioned in a useable position, the width of the aisle-space in the second configuration is greater than the width of the aisle-space in the first configuration, and the width of said one or more other seats remaining unchanged as between the first and second configurations.

The present invention also provides an aircraft in which there is installed an aircraft seat assembly according to the present invention as described herein.

It will of course be appreciated that features of the aircraft seat assembly according to the present invention may be incorporated into the aircraft fuselage or aircraft of the present invention.

BRIEF DESCRIPTION OF THE DRAWINGS

Embodiments of the present invention will now be described, by way of example only, with reference to the accompanying drawings of which:

FIGS. 1a-1c show perspective views of a row of seats according to a first embodiment of the invention, the Figures showing the row in various different configurations;

FIGS. 2a-2c show partially cut-away front views of the row of seats according to the first embodiment, the Figures showing the row in the same configurations as shown in FIGS. 1a-1c, respectively;

FIG. 3 shows an exploded perspective view of the aisle-seat of the row of seats of the first embodiment;

DETAILED DESCRIPTION OF EMBODIMENTS

FIG. 1a shows a row of aircraft seats installed in an aircraft comprising a window seat (not shown for the sake of clarity), a middle seat 10 and an aisle seat 12. The row of seats has a variable length, the length being measured as the distance between the extreme ends of the aisle seat 12 and the window seat, the extreme ends in this embodiment being defined by the arm rests 14 at either end of the row. The length of the row is at its greatest in a first configuration, the configuration illustrated in FIG. 1*a*. In the first configuration, the aisle seat 12 is in an expanded position in which the seat may be sat on by a passenger in a conventional manner.

Figure 1B:
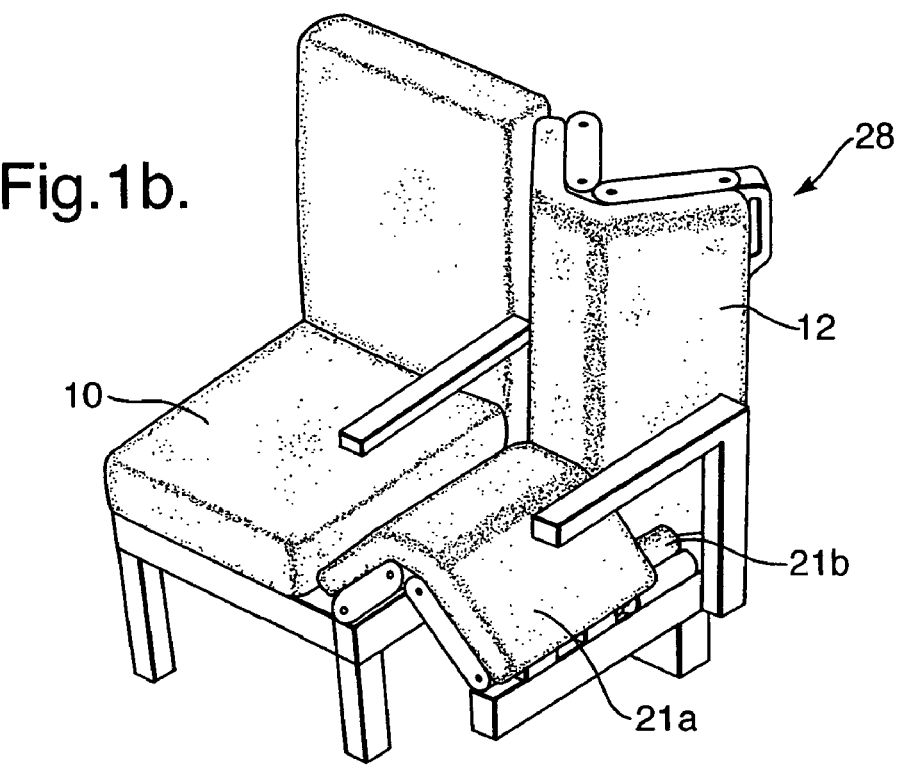
Figure 1C:
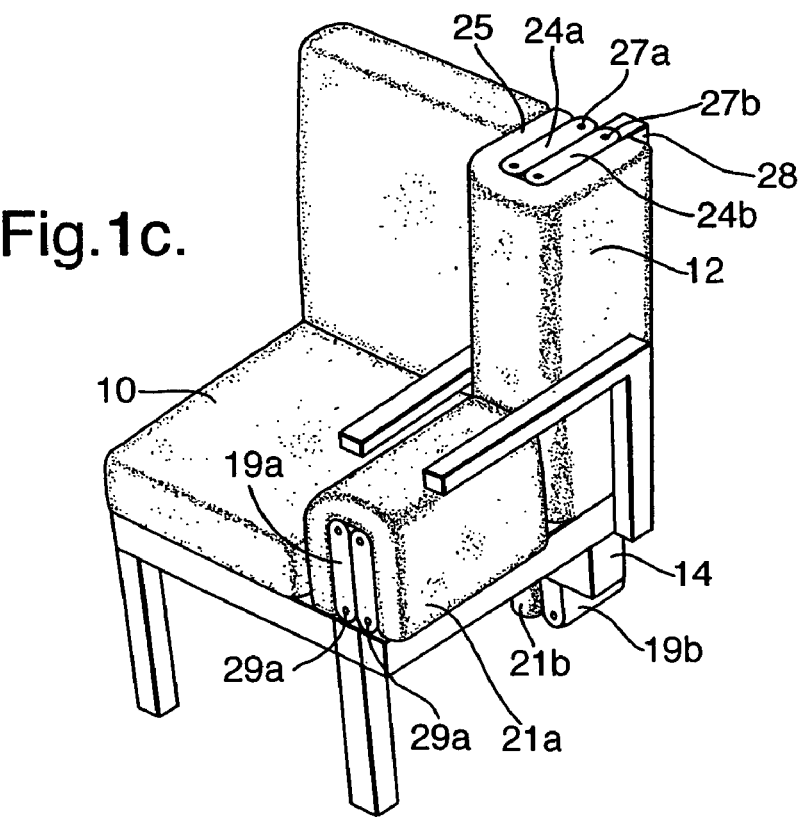

The row may be moved from the first configuration, via an intermediate configuration (shown in FIG. 1*b*), to a second configuration as shown in FIG. 1*c*, in which the length of the row is at its lowest. In the second configuration, the aisle seat 12 is folded into a collapsed position (by collapsing the seat in a horizontal direction) in which the seat can not be sat on by a passenger in the conventional manner. The width of the aisle seat 12 in the second configuration is about a third of the width of the aisle seat 12 in the first configuration (the width of the seat being measured in the same direction as the length of the row). Thus, the aisle seat 12 is moveable between a collapsed state and a useable state. The width of the other seats remains unchanged as between the first and second configurations.

Figure 2A:
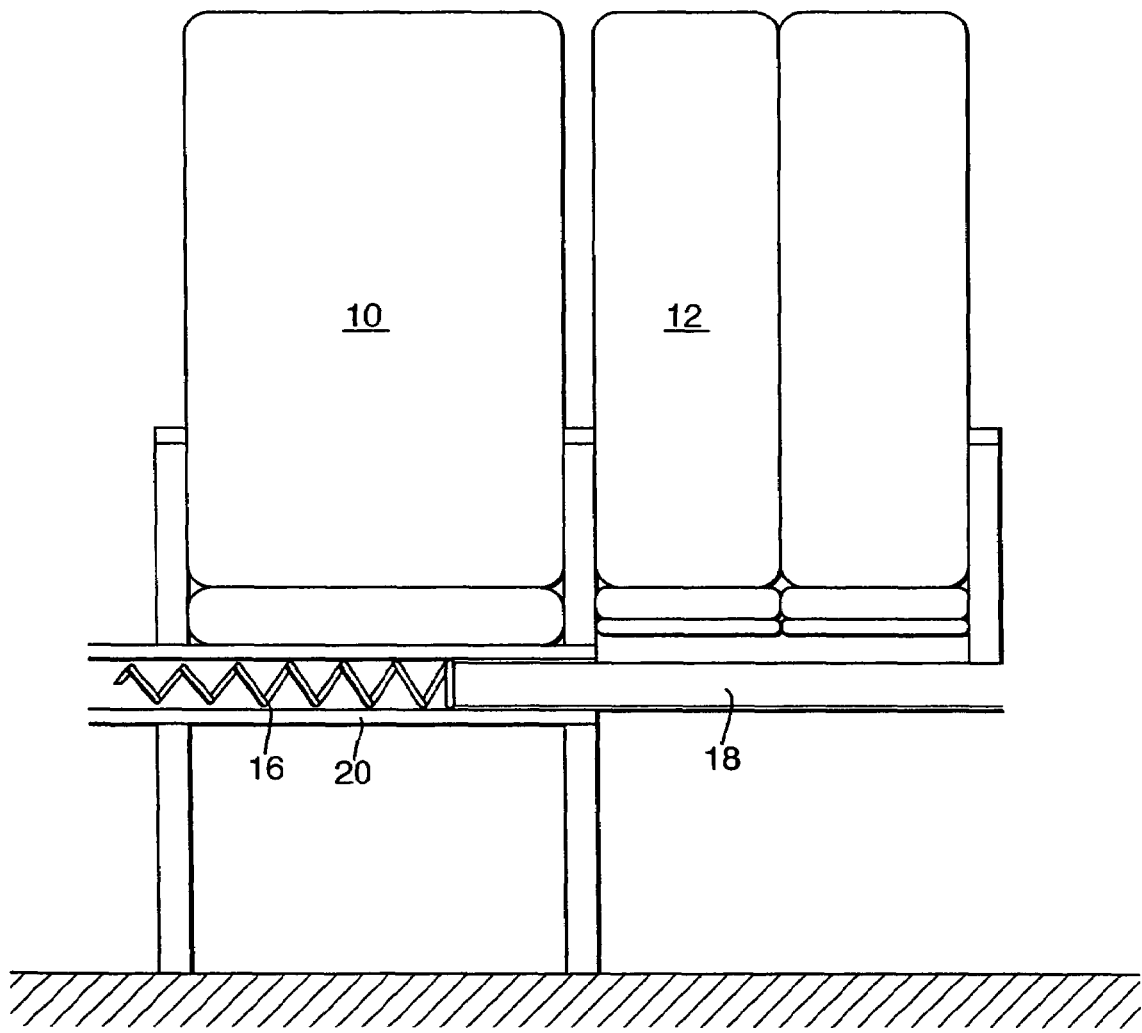
Figure 2C:
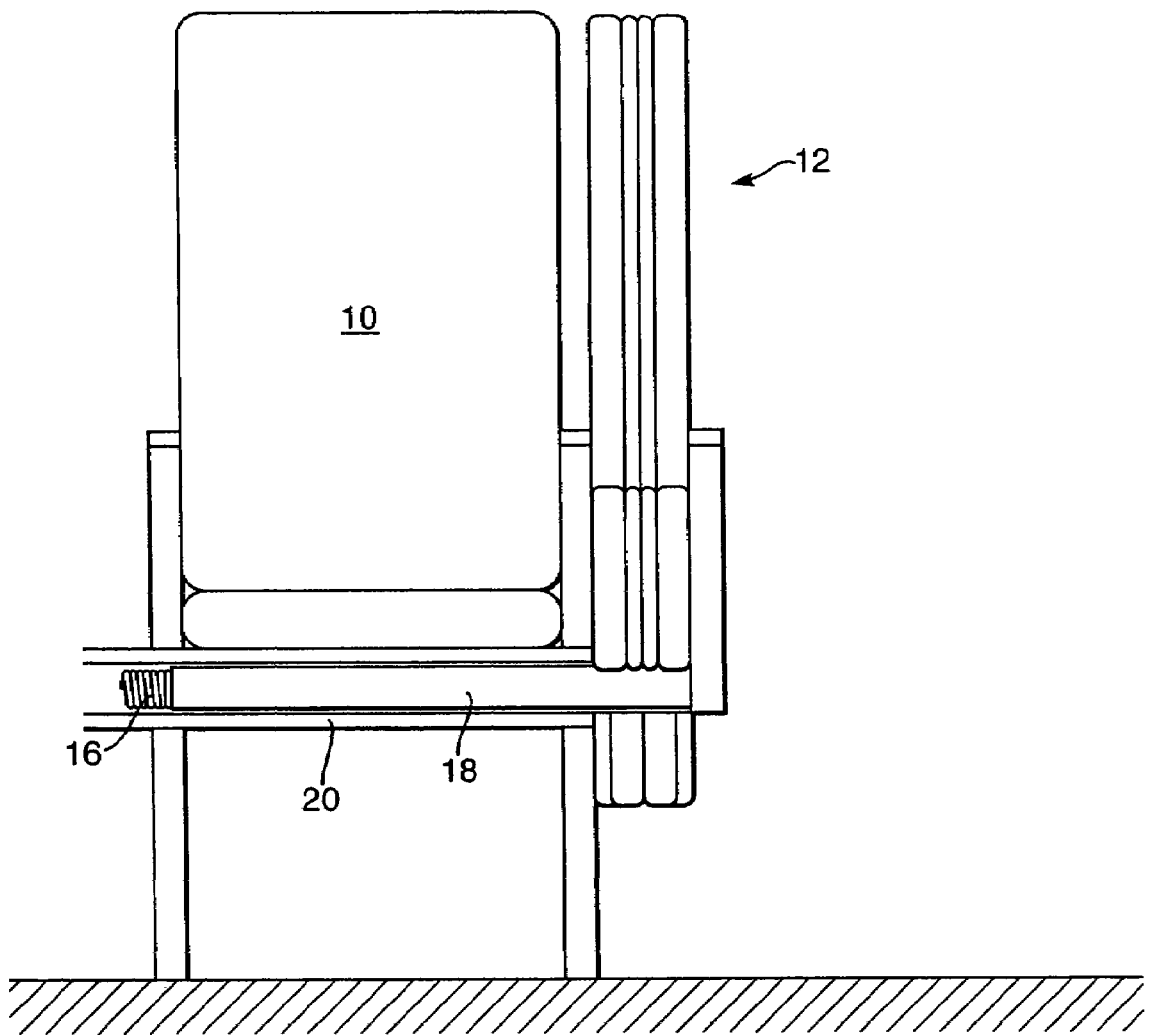

FIGS. 2*a*, 2*b* and 2*c* show front views of the middle seat 10 and the aisle seat 12 of the row in the first configuration, an intermediate configuration and the second configuration, respectively (the positions of the seats in the three drawings broadly corresponding to the positions of the seats as shown in FIGS. 1*a*, 1*b*, and 1*c*, respectively). The basic structure of the aisle seat 12 is defined by a frame formed by two telescopic arms 18, which act as cantilever beams (in a similar manner to many conventional aircraft seats), but which are moveable relative to the middle seat 10. The telescopic arms 18 are accommodated by (and retractable into and extendable from) two tubular members 20 located underneath the middle seat 10 and slide on rollers (not shown). The aisle seat 12 is associated with springs 16, which act on the two telescopic arms 18 that support the aisle seat 12. The springs 16 assist the folding of the seat into its collapsed position. The resilience of the springs is such that the springs 16 are just able to cause the seat to fold when no weight is on it and there are no other external atypical forces acting on the seat. Dampers (not shown) are provided to ensure that the recoil of the aisle seat 12 is not too fast. The seat may be manually pulled out by the handle 28 provided for that purpose (see FIGS. 1*a* to 1*c*). The aisle seat 12 is also provided with a mechanism (not shown) that aids the retention of the seat in the first configuration and a mechanism (not shown) that aids the retention of the seat in the second configuration. Such mechanisms in this embodiment are in the form of separate and independent locking mechanisms.

The construction of the aisle seat 12 will now be described with reference to FIGS. 1*a*, 1*c*, 2*b* and 3, which show the aisle seat in various positions at and between the fully folded and fully extended states (FIG. 3 showing an exploded view).

The seat includes a seat base 22 comprising a front portion 22*a* and a rear portion 22*b*. The front portion 22*a* is foldable about a horizontal line 23*a* perpendicular to the width. The front portion 22*a* comprises a cushion 21*a* mounted on two hinged panels 19*a*, linked to each other and the seat by means of rotatable connections providing for rotational movement about four parallel axes 29*a*. These panels 19*a* and axes 29*a* are shaped and positioned such that the fold line 23*a* is positioned approximately down the middle of the seat 12. The front portion 22*a* of the seat base folds in a direction such that in the folded/collapsed state the folded front portion 22*a* extends upwards from its position in the unfolded/extended state.

The rear portion 22*b* is, like the front portion, foldable about a horizontal line 23*b*, the line 23*b* lying in the same vertical plane as the fold line 23*a* of the front portion 22*a*. The rear portion 22*b* folds in an opposite way to the front portion 22*a* and thus in the folded/collapsed state the folded rear portion 22*b* extends downwards from its position in the unfolded/extended state. The construction of the rear portion 22*b* of the base 22 is similar to that of the front portion 22*a* and thus it comprises a cushion 21*b* and left and right panels 19*b* rotatably mounted to each other and to the seat.

The aisle seat 12 also comprises a back-rest 24 that is foldable about a vertical line 26 perpendicular to the width of the seat 12 and positioned midway along the width of the seat. The back-rest 24 comprises three main parts, namely a left panel 24*a*, a right panel 24*b* and a cushion 25. In the extended position, the cushion 25 lies flat across the left and right panels 24*a*, 24*b*. Each of the left and right panels 24*a*, 24*b* is rotatable about a vertical axis 27*a*, 27*b* passing through a point near the end of the panel nearest the edge of the seat. The right panel 24*b* is mounted in the rear telescopic arm 18, whereas the left panel 24*a* is mounted on a structure fixedly attached to the middle seat 10. Thus, in moving to the folded position, the left and right panels 24*a*, 24*b* rotate by 90 degrees about the vertical axes 27*a*, 27*b* and the right panel 24*b* moves towards the left such that in the folded position the panels 24*a* and 24*b* lie flat against each other, with the cushion 25 being folded around the panels 24*a*, 24*b*. The back-rest 24 folds in a direction such that in the folded/collapsed state the folded back-rest 24 extends forwardly (i.e. towards the front of the seat) from its position in the unfolded/extended state. Thus, the back rest portion 24 folds in such a way that it does not intrude into the space in front of the seat in the row behind. Also, the rear portion 22*b* of the seat base 22 folds downwards so as not to interfere with the back-rest 24 folding.

It will be appreciated that the aisle seat 12 is arranged such that the telescopic arms 18 can only slide inwards if the front portion 22*a* of the seat base 22 folds. Thus, when a passenger is sitting on the aisle seat 12, the aisle seat 12 is essentially locked in position (until the passenger rises).

The cushions 21*a*, 21*b* and 25 of the aisle seat 12 may each be of one-piece construction and arranged to stretch/deform slightly when folded or may alternatively be of two-piece construction, being split down the fold line (so that no deformation of the cushions is required when collapsing the aisle seat 12). In the first embodiment, the cushions are of one-piece construction and thus deform slightly when folded (despite the apparent two-piece cushion construction that is shown in FIGS. 2*a* to 2*c*, which are schematic in nature).

Other embodiments of the invention will now be described by way of example only. The other embodiments each relate to one or more rows of seats for use in an aircraft seat assembly and are conceptually similar to the first described embodiment in that they share various features. In each embodiment, the row of seats includes at least one convertible aisle seat and one or more other seats, the row being moveable between a first configuration in which all of the seats are positioned in a useable position and a second configuration in which the width of the aisle seat is reduced so as to increase the available aisle space.

Figure 4:
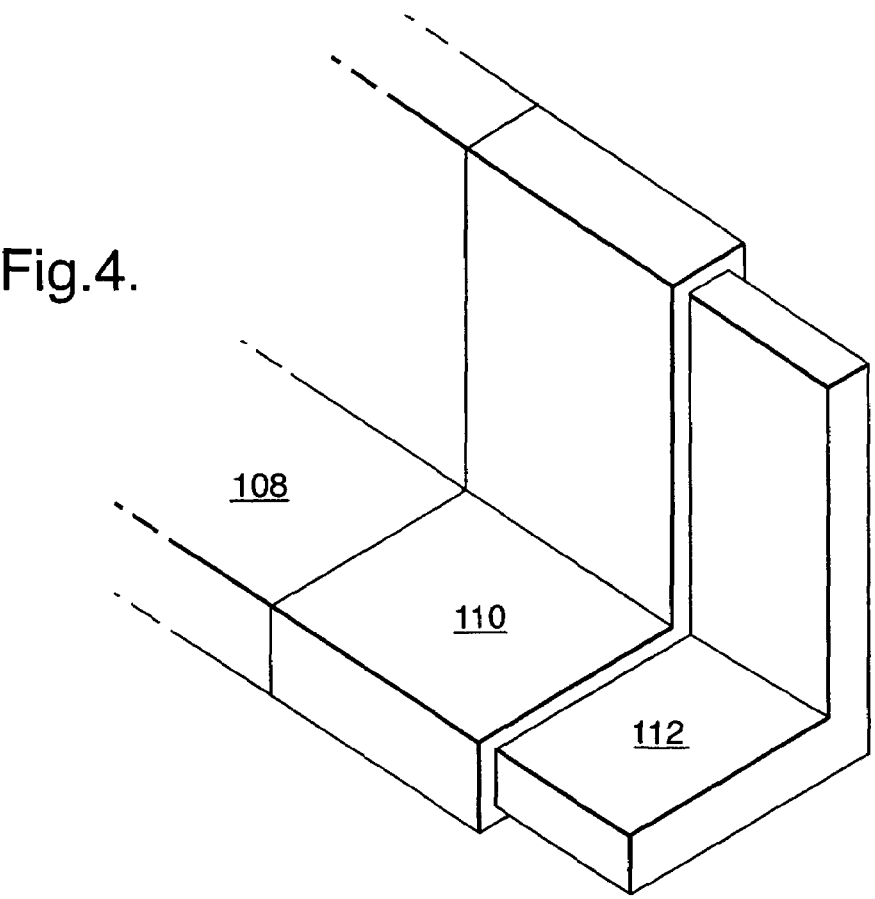
FIG. 4 is a schematic perspective view of a row of seats according to a second embodiment of the invention.

FIG. 4 shows a row of seats according to a second embodiment of the invention, the row comprising a window seat 108, a middle seat 110, and an aisle seat 112. In this embodiment, the length of the row is variable by means of the aisle seat 112 being arranged to telescope into and out of a seat-shaped cavity in the middle seat 110. The seats are each in the form of a hard plastic moulded seat covered with thin cushioning material (similar to those found on buses or underground transport). The plastic part of the aisle seat 112 is solid plastic. The adjacent seat (the middle seat 110) is larger in thickness, but hollow, thereby defining the cavity in the middle seat in which the aisle seat 112 may be stowed. In this embodiment, the aisle seat 112 is not sprung and thus needs to be manually moved to the desired configuration. However, the length of the row may be reduced by up to substantially the full width of the aisle seat 112. The position of the row of seats shown in FIG. 4 is between the first fully-extended position and the second fully-contracted position.

Figure 5:
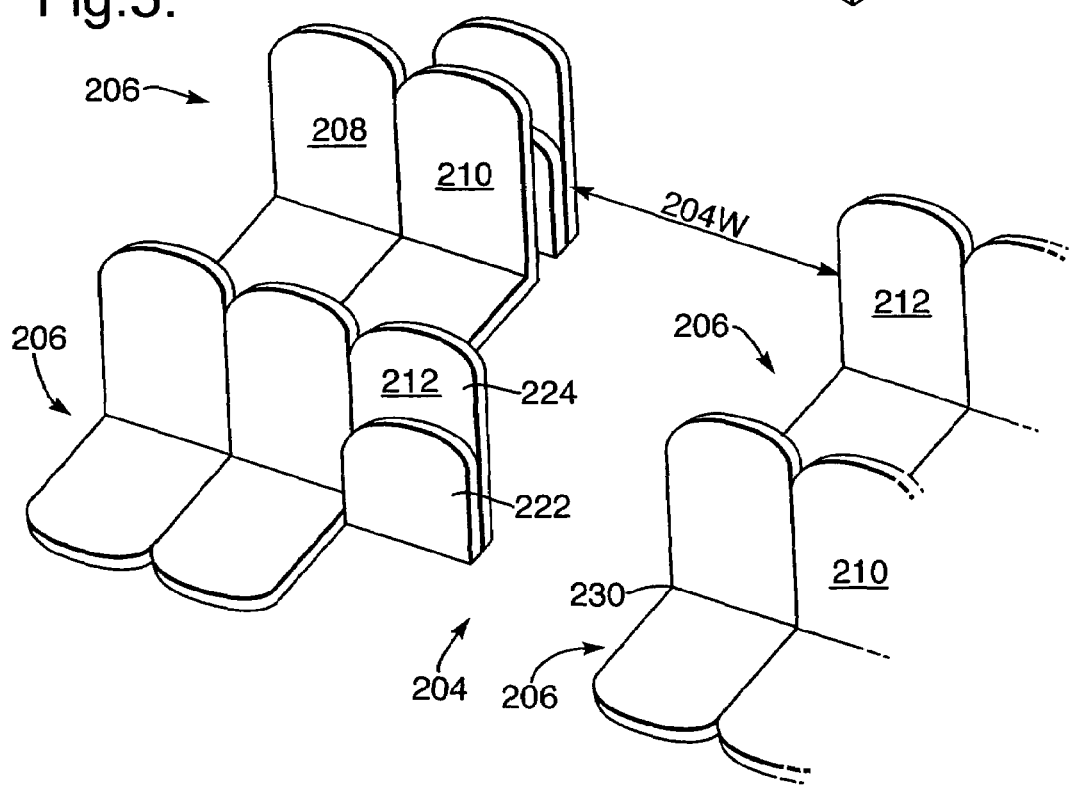
FIG. 5 is a schematic perspective view of an aircraft seat assembly including rows of seats according to a third embodiment of the invention.

FIG. 5 shows four rows 206 of an aircraft seat assembly of a third embodiment, each row including a window seat 208, a middle seat 210, and an aisle seat 212. Two of the four rows 206 shown are on one side of the aircraft and the other two of the four rows 206 are on the other side, there being an aisle 204 being defined therebetween. All of the seats have a similar shape and are all relatively thin in construction. The aisle seat 212 has a back-rest 224 and a seat base 222 that is rotatably mounted about a horizontal axis 230 lying at or very near to the join between the back-rest 224 and the seat base 222. The aisle seat 212 may be folded by rotating the seat base 222 upwards such that the seat base 222 and back-rest 224 are folded together.

The aisle seat 212 when in its folded configuration is able to be shifted rearwards to a position in which the seat 212 can then slide in a direction along the length of the row 206 so as to be positioned directly behind the middle seat 210 that is, when the row is configured in the first configuration (in which all seats are useable), adjacent to the aisle seat 212. Thus, in this embodiment, the length of the row is variable by means of the aisle seat 212 being arranged to fold and then move behind the row to be stowed. The width 204w of the aisle may thereby be increased by a distance equal to about twice the width of an aisle seat 212.

Figure 6A:
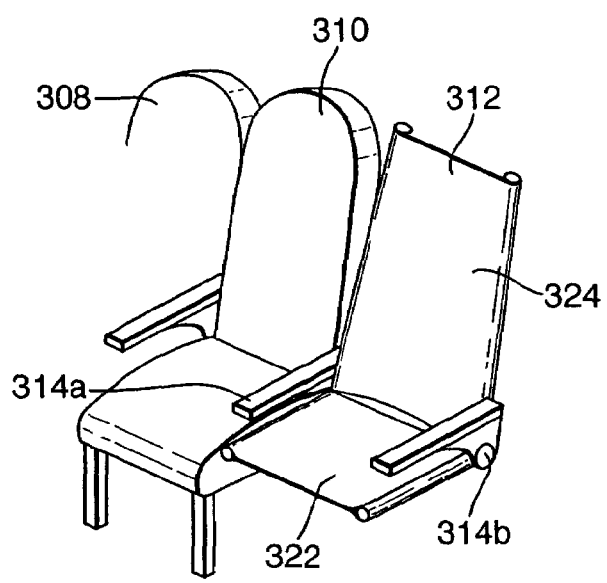
FIGS. 6a & 6b show schematic perspective views of a row of seats according to a fourth embodiment of the invention, the Figures showing the row in two different configurations.
Figure 6B:
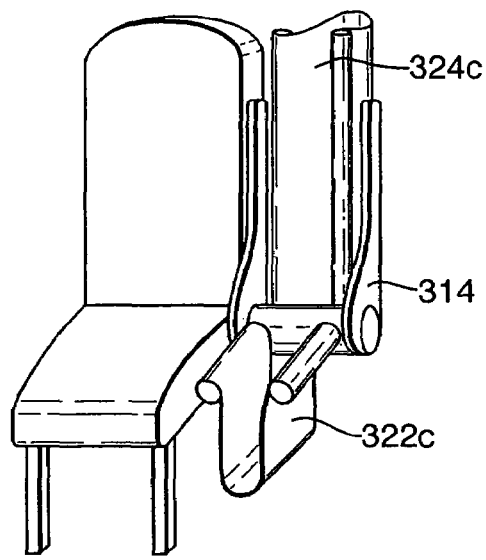
Figure 6C:
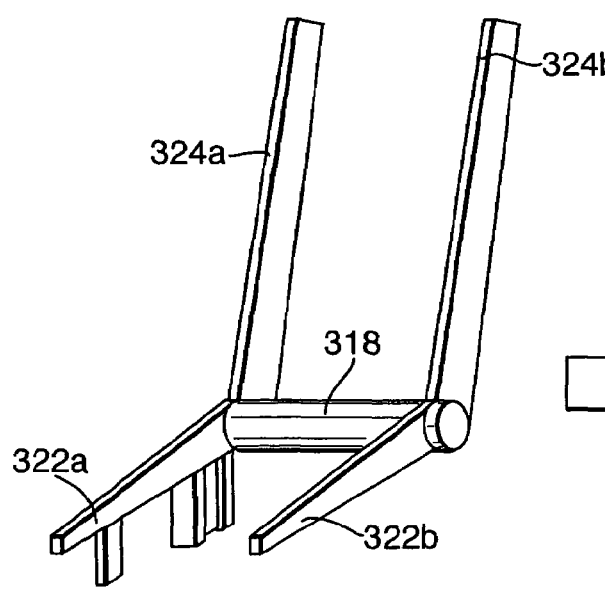
FIGS. 6c & 6d show various schematic and cut-away views of the aisle-seat of the row of seats of the fourth embodiment.
Figure 6D:
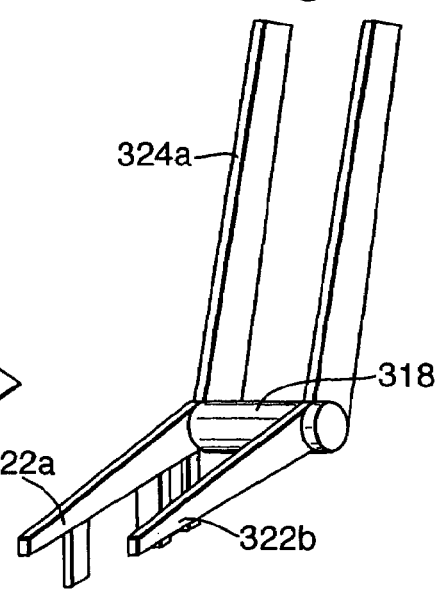

FIGS. 6a to 6d show a very simple implementation that represents a fourth embodiment of the invention. The fourth embodiment represents a simpler, but similar, version of the first embodiment. Again the row of seats includes a window seat 308, a middle seat 310, and an aisle seat 312. The window seat 308 and middle seat 310 are of conventional construction, but the aisle seat 312 is of a lightweight and simple construction. The aisle seat 312 comprises a back-rest 324 defined by flexible fabric 324c stretched (in the first configuration as shown in FIG. 6a) between two substantially vertical supports 324a and 324b. The aisle seat 312 also comprises a seat-base 322 defined by flexible fabric 322c stretched (in the first configuration) between two substantially horizontal supports 322a and 322b. The aisle seat 312 also comprises arm-rests 314a and 314b, the left-hand arm-rest 314a serving as the right-hand arm-rest of the middle seat 310. The right hand side (as shown in FIGS. 6a to 6d) of the aisle seat 312, defined by (i) the right-hand vertical support 324b, (ii) the right-hand horizontal support 322b and (iii) the right-hand arm-rest 314b is mounted on a single telescopic arm 318 that is arranged to slide into and out of a tubular member (not shown) underneath the middle seat 310. Thus, the right-hand side 314b, 322b, 324b of the aisle seat 312 may be moved towards and away from the middle seat 310 and may adopt a fully extended position as shown in FIG. 6a, in which position the aisle seat 312 is ready to be sat on by a passenger or a fully retracted position as shown in FIG. 6b, in which position the flexible fabric 322c, 324c of the seat base and back folds between the supports that hold the fabric. Of course, in the fully retracted position, the aisle seat 312 is not ready, or positioned so as, to be sat on by a passenger and is as such in an unusable configuration in which the seat has a width of about a third of its width in the useable configuration.

Whilst the present invention has been described and illustrated with reference to particular embodiments, it will be appreciated by those of ordinary skill in the art that the invention lends itself to many different variations not specifically illustrated herein. By way of example, the configuration of the seat assembly might be such that there are three continuous rows of seats defining two aisle spaces therebetween. The seats in the rows may for example, be in the form of 8 seats across the width of the aircraft, the seats being placed in a 3-2-3 configuration. In such a configuration one or more, and possibly all, of the aisle seats may be in accordance with any of the above-described embodiments. Of course, other seat configurations are possible and will be readily apparent to the skilled person.

Whilst the width of the other seats remains unchanged as between the first and second configurations in the above-described embodiments it will be of course be appreciated that the width of those other seats could also be changed such that in a third configuration, the widths of one or more of said other seats is reduced or increased.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft seat assembly, wherein the assembly comprises a continuous row of a plurality of aircraft seats configured for installation in an aircraft, including a foldable seat at one end of the row and one or more other seats, and wherein the seats are moveable between
    (i) a first configuration in which all of the seats are positioned in a useable position and
    (ii) a second configuration in which (a) the foldable seat is folded into a collapsed position in the row so that the foldable seat is unusable, (b) said one or more other seats are positioned in a useable position, and (c) the row of seats has a length, along the row, that is less than the length of the row in the first configuration by a distance more than half the width of the foldable seat in the first configuration, the width of said one or more other seats remaining unchanged as between the first and second configurations, wherein the foldable seat includes a foldable seat base comprising a front foldable portion and a rear foldable portion, the front portion being foldable about a substantially horizontal axis such that in the second configuration the folded front portion extends above the vertical position of the front portion in the first configuration and such that in the second configuration the folded rear portion extends below the vertical position of the rear portion in the first configuration.

2. An aircraft seat assembly according to claim 1, wherein the foldable seat comprises a inner side adjacent to the seat in the row that in the first configuration is adjacent to the foldable seat and an outer side at said one end of the row, the sides of the seat being moveable towards and away from each other.

3. An aircraft seat assembly according to claim 1, wherein each of the seats in the row comprise a seat base, the widths of the seat bases of the seats in the row in the first configuration being substantially the same.

4. An aircraft fuselage in which there is installed an aircraft seat assembly according to claim 1.

5. An aircraft including an aircraft fuselage according to claim 4.

6. An aircraft seat assembly according to claim 1, wherein the foldable seat comprises a foldable seat back that is foldable about a substantially upright axis, and a foldable seat base that is foldable about a substantially horizontal axis.

7. An aircraft fuselage according to claim 4 in which there is a further continuous row of a plurality of seats, there being defined an aisle-space between the two rows, wherein each row of seats includes a foldable seat at the end of the row next to the aisle-space and one or more other seats, the seats being moveable between
- i) a first configuration in which all of the seats are positioned in a useable position
- ii) a second configuration in which each foldable seat is folded into a collapsed position in the row so that the foldable seat is unusable, and said one or more seats are positioned in a usable position, the width of the aisle-space in the second configuration is greater than the width of the aisle-space in the first configuration, and the width of said one or more other seats remaining unchanged as between the first and second configurations.

* * * * *